United States Patent
Khan et al.

(10) Patent No.: US 11,381,960 B2
(45) Date of Patent: Jul. 5, 2022

(54) DYNAMIC OPERATION OF SATELLITE TERMINAL

(71) Applicant: Hughes Network Systems, LLC, Germantown, MD (US)

(72) Inventors: Tayyab Khan, Gaithersburg, MD (US); Venkat Ganesan, Germantown, MD (US); Krishna Samavedam, Rockville, MD (US); Wenbin Zhen, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 256 days.

(21) Appl. No.: 16/231,871

(22) Filed: Dec. 24, 2018

(65) Prior Publication Data

US 2020/0204983 A1 Jun. 25, 2020

(51) Int. Cl.

| | |
|---|---|
| *G06F 15/177* | (2006.01) |
| *H04W 8/24* | (2009.01) |
| *G01S 19/42* | (2010.01) |
| *H04B 7/185* | (2006.01) |
| *H04L 41/0853* | (2022.01) |
| *H04L 41/0869* | (2022.01) |
| *H04W 4/021* | (2018.01) |
| *H04W 48/04* | (2009.01) |
| *H04W 64/00* | (2009.01) |

(52) U.S. Cl.
CPC ............. *H04W 8/245* (2013.01); *G01S 19/42* (2013.01); *H04B 7/18513* (2013.01); *H04L 41/0853* (2013.01); *H04L 41/0869* (2013.01); *H04W 4/021* (2013.01); *H04W 48/04* (2013.01); *H04W 64/003* (2013.01)

(58) Field of Classification Search
CPC ... H04L 12/18; H04L 49/201; H04L 65/4076; H04L 41/0853; H04L 41/0869; G06F 15/16; G06F 16/20; H04W 8/245; H04W 4/021; H04W 48/04; H04W 64/003; G01S 19/42; H04B 7/18513; H04B 7/18519
USPC .......................................... 709/222; 455/418
See application file for complete search history.

(56) References Cited

U.S. PATENT DOCUMENTS

| | | | |
|---|---|---|---|
| 6,854,009 B1 * | 2/2005 | Hughes ................. | G06F 9/4406 709/219 |
| 8,570,940 B1 | 10/2013 | Yenney et al. | |
| 2002/0082858 A1 * | 6/2002 | Heddaya ................. | G06F 8/61 705/26.1 |
| 2003/0097654 A1 | 5/2003 | Franken et al. | |
| 2006/0224742 A1 * | 10/2006 | Shahbazi ................ | H04L 63/20 709/226 |
| 2007/0180495 A1 * | 8/2007 | Hardjono ............ | H04W 12/122 726/3 |
| 2007/0296573 A1 * | 12/2007 | Schlesier .............. | H04W 4/029 340/539.13 |

(Continued)

OTHER PUBLICATIONS

International Preliminary Report on Patentability for PCT/US2019/067726 dated Jul. 8, 2021 (7 pages).

*Primary Examiner* — Padma Mundur
(74) *Attorney, Agent, or Firm* — Bejin Bieneman PLC

(57) ABSTRACT

A server computer can receive, from a terminal via a satellite, a configuration request that includes a location of the terminal. The server computer can select, based on the location, configuration data including a specification of communications by the terminal, and then send the configuration data to the terminal via the satellite.

11 Claims, 2 Drawing Sheets

(56) References Cited

U.S. PATENT DOCUMENTS

| | | | | |
|---|---|---|---|---|
| 2007/0297396 A1* | 12/2007 | Eldar | .................... | H04L 63/08 |
| | | | | 370/356 |
| 2008/0238767 A1* | 10/2008 | Zhou | ..................... | G01S 19/09 |
| | | | | 342/357.62 |
| 2010/0198400 A1* | 8/2010 | Pascal | .................. | G11B 31/00 |
| | | | | 700/232 |
| 2012/0209773 A1* | 8/2012 | Ranganathan | ..... | G06Q 20/3224 |
| | | | | 705/44 |
| 2013/0163516 A1* | 6/2013 | Baek | .................. | H04B 7/1851 |
| | | | | 370/328 |
| 2014/0213233 A1* | 7/2014 | Parry | .................. | H04W 8/245 |
| | | | | 455/418 |
| 2015/0099545 A1* | 4/2015 | Hyun | ............... | H04M 3/42357 |
| | | | | 455/456.3 |
| 2016/0029204 A1* | 1/2016 | Lalwaney | ............... | H04W 8/22 |
| | | | | 455/418 |
| 2017/0188372 A1* | 6/2017 | Reis | .................... | H04W 4/029 |
| 2017/0307388 A1* | 10/2017 | McConathy | ....... | G01C 21/3461 |
| 2020/0128383 A1* | 4/2020 | Maier | ................ | G08B 25/016 |

* cited by examiner

DYNAMIC OPERATION OF SATELLITE TERMINAL

BACKGROUND

A satellite network allows traffic between devices, terminals, satellite(s), and gateways. A terminal in a satellite network could be used from a wide variety of locations, if not anywhere, in the world.

DETAILED DESCRIPTION

Introduction

A system comprises a server that includes a processor and a memory, the memory storing instructions executable by the processor to receive, from a terminal via a satellite, a configuration request that includes a location of the terminal; select, based on the location, configuration data including a specification of communications by the terminal; and send the configuration data to the terminal via the satellite. The system can further comprise the terminal, including a terminal processor and a terminal memory, the terminal memory storing instructions executable by the terminal processor to, upon determining that a boot is an initial boot, transmit the configuration data to the server via the satellite. The terminal memory can store further instructions executable by the terminal processor to, upon determining that the boot is an initial boot, configure the terminal according to default configuration data. The can store further instructions executable by the terminal processor to, upon receiving the configuration data, configure the terminal according to configuration data received via the satellite. The location can be specified according to geo-coordinates. The instructions in the server can further comprise instructions to retrieve second location data based on an identifier in the configuration data, and to reject the configuration request when the second location data indicates a location beyond a specified distance of the geo-coordinates. The specification of communications by the terminal can include wireless network channels. The configuration data further can includes a display language of the terminal.

A method, comprises receiving, in a server computer and from a terminal via a satellite, a configuration request that includes a location of the terminal; selecting, based on the location, configuration data including a specification of communications by the terminal; and sending the configuration data to the terminal via the satellite. The method can further comprise, in the terminal, upon determining that a boot is an initial boot, transmitting the configuration data to the server via the satellite. The method can further comprise, upon determining that the boot is an initial boot, configuring the terminal according to default configuration data. The method can further comprise configuring the terminal according to configuration data received via the satellite. The location can be specified according to geo-coordinates. The method can further comprise retrieving second location data based on an identifier in the configuration data, and rejecting the configuration request when the second location data indicates a location beyond a specified distance of the geo-coordinates. The specification of communications by the terminal can include wireless network channels. The configuration data can further include a display language of the terminal.

Exemplary System Elements

Figure 1:
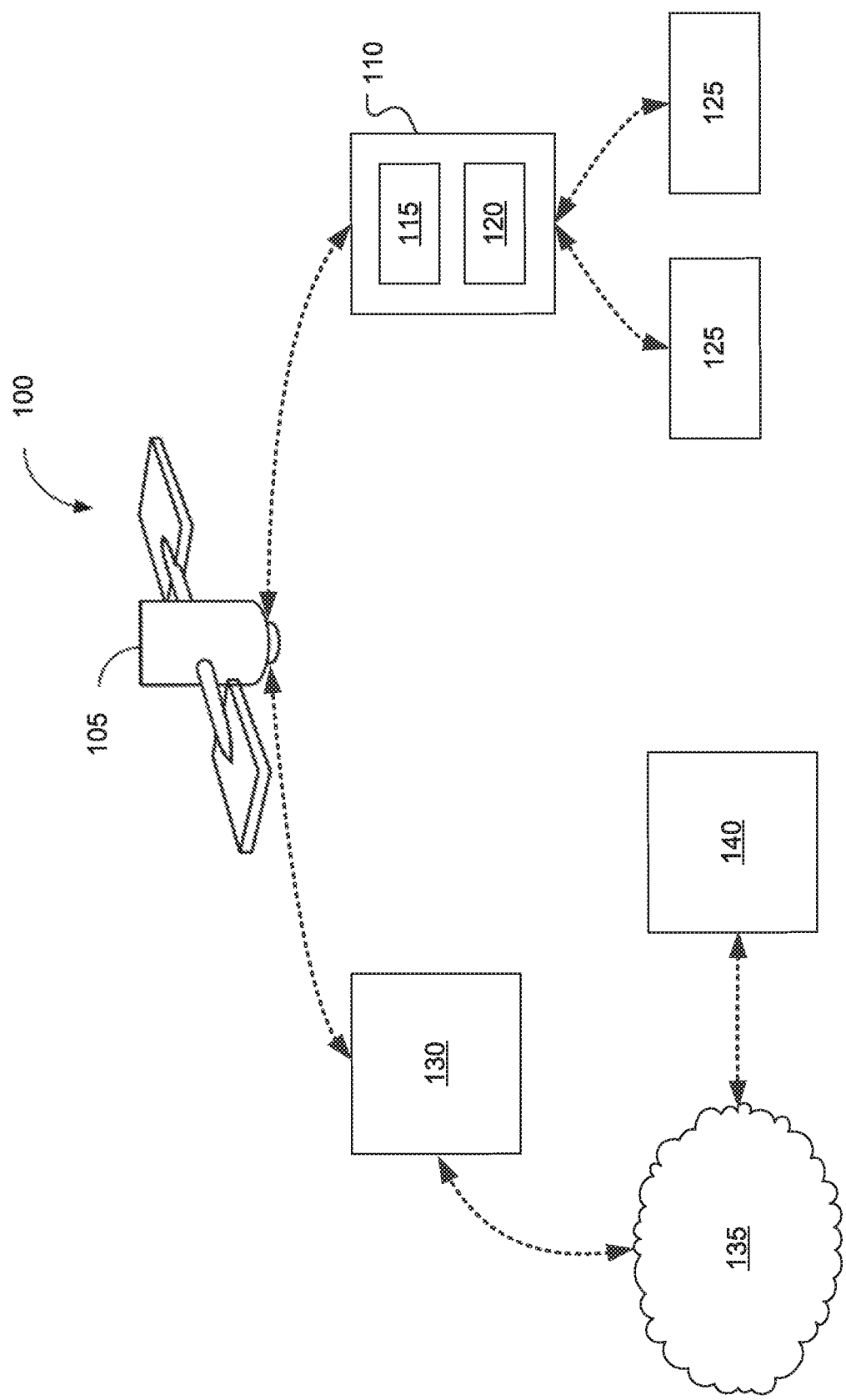
FIG. 1 illustrates an example satellite telecommunications network system.

As illustrated in FIG. 1, a satellite network system 100 (sometimes referred to herein as a satellite network or communication network 100) includes satellites 105, terminals 110, gateways 130, and/or a control server 140, each having a processor, a memory and, as will be understood, typically other hardware components. More than one of each of the devices shown in FIG. 1 may be, and typically will be, present in the system 100; multiple devices are not shown simply for ease of illustration.

A computer memory, e.g., for storing instructions executable by a processor, can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component(s) and may include one or more microcontrollers, one or more field programmable gate arrays (FPGAs), one or more application specific integrated circuits (ASICs), one or more digital signal processors (DSPs), one or more customer specific integrated circuits, etc. The processors may be included in and programmed to execute instructions stored in a memory to carry out the actions of, variously, satellites 105, terminals 110, and gateways 130, as discussed herein.

A plurality of satellites 105 can collectively form a constellation (i.e., a group) of network nodes whose position changes relative to one another, to the ground, or both. The satellites 105 include various circuits, chips, or other electronic components. Satellites 105 may be in low Earth orbit (LEO) in multiple planes and orbits relative to one another and/or may be in geostationary orbit (GEO). Examples of orbits may include a polar orbit, a geosynchronous orbit, or an inclined orbit. Because the satellites 105 are moving relative to the ground, the downlink and uplink beams served by each respective satellite 105 changes over time. Moreover, because the satellites 105 can move relative to one another, neighboring satellites 105 may also change over time. Thus, the other satellites 105 available for direct communication may change as one or more of the satellites 105 moves.

Terminals 110, e.g., very small aperture terminals (VSAT), include satellite interfaces 115 that are computer-based communication devices implemented via circuits, chips, antennas, or other electronic components that can communicate with satellites 105 that are within communication range of the terminal 110. The terminal 110 interface 115 may include a modulator and a demodulator to facilitate communications with satellites 105, especially in the context of satellite 105 communication. In some instances, the terminals 110 are stationary relative to a location on Earth. In other instances, the terminals 110 are mobile, meaning that the terminals 110 move relative to a location on the Earth. Moreover, each terminal 110 may have one or more antennas. Multiple antennas may allow a terminal 110 to communicate with multiple satellites 105 at a time.

The terminal 110 further includes a local interface 120 between a satellite 105 and other ground-based communication devices. For instance, the terminal 110 may receive communications from a satellite 105 via the satellite interface 115, and transmit such communications via terrestrial-based communication channels such as the local interface 120. Likewise, the terminals 110 may receive communications via a terrestrial-based communication channel such as the local interface 120 and transmit the communication to a satellite 105 via the interface 115. In one example, the local interface 120 includes a wireless router, e.g. operating according to the IEEE 802.11 specification, i.e., the protocol popularly known as Wi-Fi®. Via Wi-Fi or the like in a local interface 120, the terminal 110 may communicate with one or more devices 125, e.g., via a wireless communication network to multiple user devices 125, e.g., laptop or desktop computers, smart phones, tablets, etc., within a coverage range, e.g., 200 meters, of the local area network of the terminal 110.

Gateways 130 are computer-based communication devices implemented via circuits, chips, antennas, or other electronic components that can communicate with one or more satellites 105 within the communication range of the gateway 130, and with devices such as a server 140 via a wide area network 135. Each gateway 130 may be programmed to use different uplink and downlink methods to transmit data to and receive data from satellites 105. In one example, a gateway 130 may connect a network 135 to a satellite 105. In another example, a gateway 130 may be connected via other gateways 130 to a satellite 105. The gateways 130 may be either data gateways or system gateways. Data gateways 130 may be used to facilitate multiple communication protocols along a network path. For instance, a data gateway may be used to facilitate a transition from a satellite 105 communication network to, e.g., a fiber optic network.

Each system gateway 130 may be programmed to transmit control and configuration data to satellites 105 as well as receive data, such as telemetry data, from satellites 105. The system gateways 130 may be configured to form a routing network for receiving packets on the downlink before uplinking the packets to a different node, including a different satellite 105. Since system gateways 130 can communicate with one or more satellites 105, the system gateway 130 may be able to receive packets via the downlink from one satellite 105 and uplink the packets to a different satellite 105 without having to store and forward the packets. And because system gateways 130 are programmed to transmit control and configuration data to satellites 105, the system gateway 130 may be programmed to upload routing tables to any number of satellites 105 within the communication range of the system gateway 130. The system gateway 130 may further include instructions for propagating the routing table to other satellites 105.

For example, different telecommunications services, such as cellular technologies 2G, 3G, and 4G/LTE (Long-Term Evolution), may be provided through a same remote terminal 110 and a same gateway 130. Thus, rates for some traffic, such as traffic for 2G and 3G service, which is smaller in volume and throughput than traffic for 4G/LTE service, can be configured as separate (Virtual Local Area Network) VLANs, and the satellite network 100 can ensure that the configured rates are met when there is sufficient demand for such traffic. In other words, by separating the different types of traffic onto different VLANs, some traffic, such as 4G/LTE traffic, will not starve other traffic, such as 2G and 3G traffic. When there is not sufficient demand for the 2G and 3G traffic, all remaining bandwidth can go toward servicing the 4G/LTE traffic in a best effort model to reach the peak information rate (PIR) or maximum information rate.

The wide area network (or WAN) 135 represents one or more mechanisms, typically including the Internet, for sending and receiving data between user devices 105, a server 115, etc. The WAN 135 is distinguished from a local area network (or LAN) in that the WAN 135 can encompass any distance on the surface of the earth, whereas a LAN is limited to a specified geographic area, typically a single building, complex, or campus. The network 135 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). A LAN may be included in a WAN 135 and may include wireless and/or wired mechanisms, such as Wifi®, Ethernet, etc., but typically does not by itself include mechanisms designed for long-range communications, such as cellular or satellite.

The server 140 is a computing device connected via a wired and/or wireless connection to communicate via the network 135. The server 140 typically includes and/or can access a non-volatile memory or data store that includes terminal configuration data. Further, the server 140 typically includes programming for receiving a configuration request from a terminal 110, retrieving terminal configuration data applicable to the requesting server, i.e., according to terminal configuration parameters included in the request, and for responding to the configuration request by providing the terminal 110 with the applicable configuration data.

Configuration parameters in the present context means items of data on which values included in configuration data depend. Example configuration parameters include location data, e.g., geo-coordinates in the form of latitude, longitude pairs, a physical address, and/or other data specifying a location of a terminal 110. Configuration data in the present context means items of data that specify or limit operation of a terminal 110. For example, configuration data in the system 100 typically includes a specification or limitation of interface 120 communications, i.e., wireless transmission and reception of data, e.g., a specification of a frequency and/or channels within a frequency by which the interface 120 can provide wireless communications, e.g., communicate with devices 125, establish a Wi-Fi network or the like, etc. Example configuration data include a list of Wi-Fi channels that a local interface 120 and a terminal 110 is to use, e.g., for each one or more frequencies (such as 2.4 gigahertz and 5 gigahertz), a language for a display of a terminal 110, etc.

The server 140 (or its accessible data store) can store terminal configuration data in a table or the like. For example, a terminal configuration data table could have columns or fields including "location," "2.4 gigahertz channels," "5 gigahertz channels," "display language," etc. Table 1 below shows an example of terminal configuration data:

TABLE 1

| Location | 2.4 GHz Channels | 5 GHz Channels | Display Language |
|---|---|---|---|
| United States | 1 2 3 4 5 6 7 8 9 10 11 | 36 40 44 48 52 56 60 64 100 104 108 112 116 120 124 128 132 136 140 149 153 157 161 165 | English |
| Brazil | 1 2 3 4 5 6 7 8 9 10 11 12 13 | 36 40 44 48 52 56 60 64 100 104 108 112 | Portuguese |

TABLE 1-continued

| Location | 2.4 GHz Channels | 5 GHz Channels | Display Language |
|---|---|---|---|
| | | 116 120 124 128 132 136 140 149 153 157 161 165 | |
| Argentina | 1 2 3 4 5 6 7 8 9 10 11 12 13 | 52 56 60 64 149 153 157 161 165 | Spanish |
| United Arab Emirates | 1 2 3 4 5 6 7 8 9 10 11 12 13 | None | Arabic |

The "location" field in each record could be used as a key to locate a record of configuration data, e.g., specified Wi-Fi channels, display language, etc., based on received configuration parameters. Data in the "location" field for each record or row in the table could specify a political entity such as country, a city, a state or province, etc., and/or an area specified according to geo-coordinates, e.g., a rectangular geo-fenced or bounded area. Received configuration parameters could specify a location, e.g., a set of geo-coordinates, which the server 140 could then use, either via a lookup table or the like specifying a country or other political entity for the received geo-coordinates, or by identifying a range of geo-coordinates in a record or field of the terminal configuration data table, to retrieve configuration data, e.g., Wi-Fi channels, display language, etc., from the terminal configuration data table.

Processing

Figure 2:
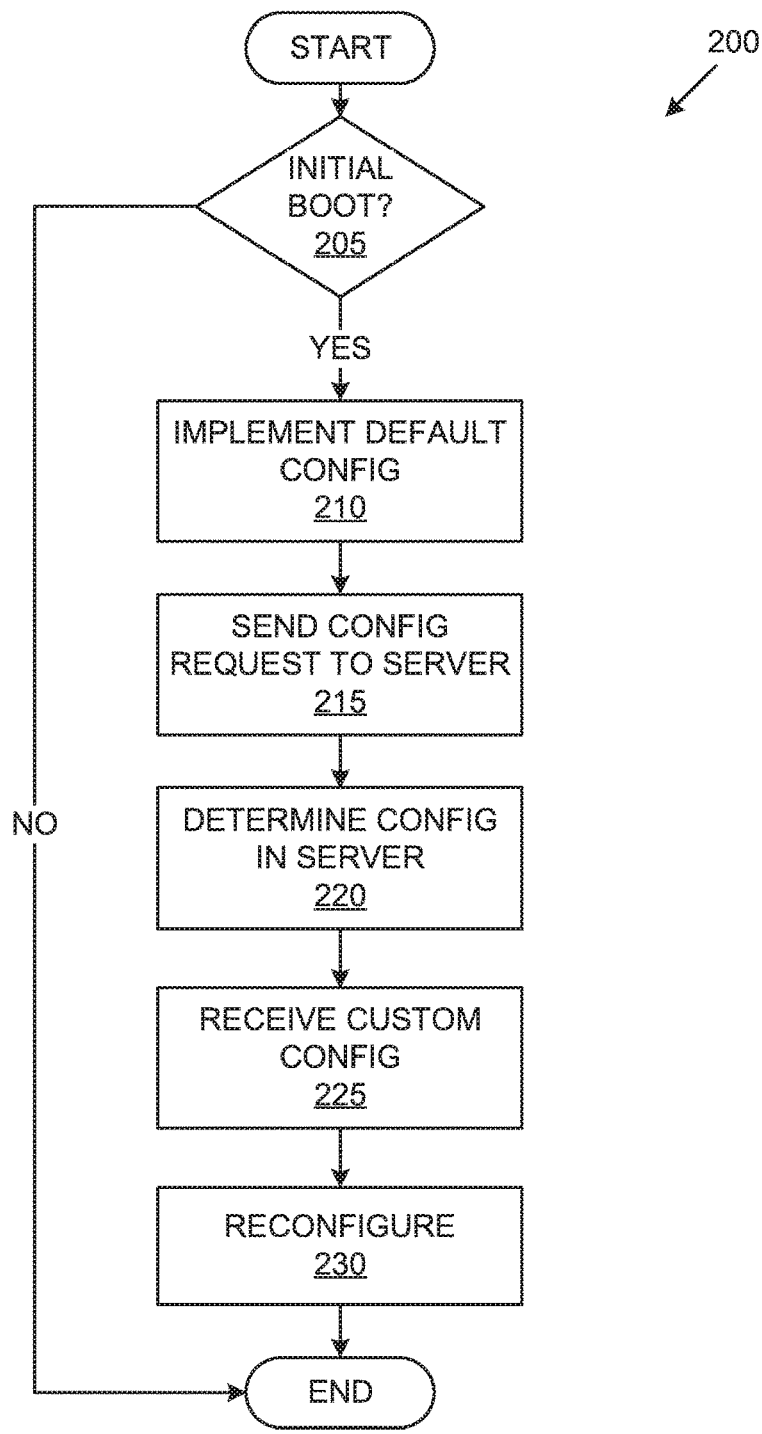
FIG. 2 is a flowchart of an example process for configuring a terminal in the system of FIG. 1.

FIG. 2 is a flowchart of an example process 200 for configuring a terminal 110 in the system 100 of FIG. 1.

The process 200 begins in a block 205, in which a terminal 110, upon being booted up, executes program instructions to determine whether the terminal 110 is undergoing an initial boot at a current location. The term "boot" should be given its conventional meaning in this context, i.e., booting the terminal 110 means that the terminal 110 is powered on and a boot loader program or the like loads from a non-volatile memory, typically into a volatile memory, program instructions that are then executed by a processor of the terminal 110. A boot loader can retrieve from the non-volatile memory various parameters, i.e., data values, for operating the terminal 110, including a stored location parameter, e.g., a geo-coordinate latitude, longitude pair, specifying a current physical location of the terminal 110 or specifying "unknown" (or some similar data value or a NULL value) as the location parameter. Further, during a boot, the terminal 110 can execute instructions to determine a current location, e.g., by requesting user input and/or according to conventional global positioning system (GPS) hardware and software.

An initial boot is a boot of the terminal 110 in which the terminal 110 determines that it has no stored location data, i.e., no location determined and stored after a prior boot for retrieval in subsequent boots, typically a first boot of the terminal 110 at a location, or additionally or alternatively a boot in which a retrieved location value is determined to differ by more than a predetermined distance, e.g., one kilometer, from a last stored location. Accordingly, during a boot, program instructions in the terminal 110 are executed to determine whether a prior boot of the terminal 110 was at an unknown location or was at a specified location (i.e., a location parameter and not a data value indicating "unknown," NULL, etc., has been retrieved from non-volatile memory) other than the current location, i.e., whether the boot is an initial boot. For example, the initial boot of a terminal 110 can occur in a first boot after the terminal 110 has been shipped to the location by a manufacturer or seller of the terminal 110. The terminal 110 can determine its location according to a global positioning system (GPS) device. The terminal 110 could alternatively determine its location according to user input, although it is typically desirable not to allow user input specifying a terminal 110 location to prevent a user from circumventing restrictions that may be placed on the terminal 110 according to its location.

If the boot is an initial boot, then the process 200 proceeds to a block 210. Otherwise, the process 200 ends.

In the block 210, which could be omitted in some implementations, the terminal 110 retrieves from a memory, and implements, i.e. begins to use, default configuration data, i.e., configuration data to be used prior to or otherwise in the absence of receipt of configuration data from a server 140. For example, the terminal 110 could be provided with a default language, e.g., English, and default sets of Wi-Fi channels for the 2.4 and 5 gigahertz bands, respectively, e.g., channels used in all or virtually all countries around the world. Conventional programming can be included in the terminal 110 to implement a configuration, e.g., to have the terminal 110 operate according to indicated Wi-Fi channel(s) and/or a display language. Default configuration data can thus allow the terminal 110 to operate even if configuration data cannot be obtained from a server 140 and/or while the terminal 110 is waiting to obtain configuration data from the server 140.

Next, in a block 215, the terminal 110, via the satellite interface 115, the satellite 105, the gateway 130 and network 135, transmits a configuration request including configuration parameters to the server 140. Typically the configuration request, as noted above, includes a location of the terminal 110, and could also include a substantially unique identifier and/or other parameters that could be used to locate configuration data for the terminal 110 in the server 140. For example, such other configuration parameters could include hardware limitations of the local interface 120 (e.g., only 2.4 gigahertz bands, and not 5 gigahertz bands available), etc.

Next, in the block 220, the server 140 receives the configuration request from the terminal 110, and retrieves configuration data for the terminal 110. For example, as explained above, the configuration request could include a location according to which the server 140 could retrieve configuration data for the terminal 110 from a table or the like in a memory or data store of the server 140. Further, the server 140, e.g., according to a terminal 110 identifier included in the configuration request, could identify a terminal 110 subscriber or user and a physical address thereof, which could be used as an alternative to, or to confirm, a location provided in a configuration request. For example, even if a location is provided in a configuration request according to geo-coordinates, the server 140 could reject the configuration request, i.e., end the process 200 (although this is not shown in FIG. 2) with or without a further communication to the terminal 110 upon determining that a subscriber's physical address was not within a predetermined distance, e.g., 10 kilometers, and/or not within a specified political entity of, the subscriber's physical address.

Next, in a block 225, the server 140, via the network 135, gateway 130, satellite 105, and terminal 110 satellite interface 115, sends, and the terminal 110 receives, the configuration data retrieved in the block 220.

Next, in a block 230, the terminal 110 configures or reconfigures itself according to the received configuration data. That is, the terminal 110 executes programming as is known to enable Wi-Fi channels specified in the configuration data, to display and receive user input and output, respectively, and a specified language, etc.

Following the block 230, the process 200 ends.

CONCLUSION

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, e.g., embedded in a customized chipset, the Mac OSX and iOS operating systems distributed by Apple Inc. of Cupertino, Calif., and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising a server that includes a processor and a memory, the memory storing instructions executable by the processor to:
   receive, from a terminal via a satellite, a configuration request that includes a terminal subscriber identifier and a location of the terminal, wherein the location is specified according to geo-coordinates;
   select, based on the location, configuration data including a specification of channels available in a wireless local area network by the terminal at the location;
   retrieve a subscriber address based on the terminal or subscriber identifier in the configuration request;
   reject the configuration request when the retrieved subscriber address indicates a location beyond a specified distance of the geo-coordinates; and
   send the configuration data to the terminal via the satellite when the retrieved subscriber address indicates a location within the specified distance of the geo-coordinates,
   wherein the system further comprises the terminal, including a terminal processor and a terminal memory, the terminal memory storing instructions executable by the terminal processor to, upon determining that a boot is an initial boot at the location, transmit the configuration request to the server via the satellite.

2. The system of claim 1, the terminal memory storing further instructions executable by the terminal processor to, upon determining that the boot is an initial boot, configure the terminal according to default configuration data.

3. The system of claim 1, the terminal memory storing further instructions executable by the terminal processor to, upon receiving the configuration data, configure the terminal according to configuration data received via the satellite.

4. The system of claim 1, wherein the configuration data further includes a display language of the terminal.

5. A method, comprising:
   receiving, in a server computer and from a terminal via a satellite, a configuration request that includes a terminal or subscriber identifier and a location of the terminal, wherein the location is specified according to geo-coordinates;
   selecting, based on the location, configuration data including a specification of channels available in a wireless local area network by the terminal at the location;
   retrieving a subscriber address based on the subscriber identifier in the configuration request;
   rejecting the configuration request when the retrieved subscriber address indicates a location beyond a specified distance of the geo-coordinates; and
   sending the configuration data to the terminal via the satellite when the retrieved subscriber address indicates a location within the specified distance of the geo-coordinates,
   wherein the method further comprises, in the terminal, upon determining that a boot is an initial boot at the location, transmitting the configuration request to the server via the satellite.

6. The method of claim 5, further comprising, upon determining that the boot is an initial boot, configuring the terminal according to default configuration data.

7. The method of claim 5, further comprising configuring the terminal according to configuration data received via the satellite.

8. The method of claim 5, wherein the configuration data further includes a display language of the terminal.

9. A system comprising a server and a terminal,
   wherein the server includes a first processor and a first memory, the first memory storing instructions executable by the first processor to:
      receive, from the terminal via a satellite, a configuration request that includes a terminal or subscriber identifier and a location of the terminal, wherein the location is specified according to geo-coordinates;
      select, based on the location, configuration data including a specification of channels available in a wireless network by the terminal at the location;
      retrieve a subscriber address based on the subscriber identifier in the configuration request;
      reject the configuration request when the retrieved subscriber address indicates a location beyond a specified distance of the geo-coordinates; and
      send the configuration data to the terminal via the satellite when the retrieved subscriber address indicates a location within the specified distance of the geo-coordinates;
   further wherein the terminal includes a second processor and a second memory, the second memory storing instructions executable by the second processor to, upon determining that a boot is an initial boot at the location, transmit the configuration request to the server via the satellite.

10. The system of claim 9, the terminal memory storing further instructions executable by the terminal processor to, upon receiving the configuration data, configure the terminal according to configuration data received via the satellite.

11. The system of claim 9, wherein the configuration data further includes a display language of the terminal.

* * * * *